United States Patent
Tsuji et al.

(10) Patent No.: US 8,383,005 B2
(45) Date of Patent: Feb. 26, 2013

(54) THERMALLY CONDUCTIVE SILICONE GREASE COMPOSITION

(75) Inventors: Kenichi Tsuji, Annaka (JP); Kunihiro Yamada, Annaka (JP); Hiroaki Kizaki, Annaka (JP); Nobuaki Matsumoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/282,797

(22) Filed: Oct. 27, 2011

(65) Prior Publication Data

US 2012/0119137 A1    May 17, 2012

(30) Foreign Application Priority Data

Nov. 12, 2010  (JP) ................................ 2010-253762

(51) Int. Cl.
*C09K 5/10* (2006.01)
*C08G 77/04* (2006.01)
*C08G 77/12* (2006.01)
*C08G 77/20* (2006.01)

(52) U.S. Cl. .............. 252/78.3; 528/31; 528/32; 528/33

(58) Field of Classification Search ........................ None
See application file for complete search history.

(56) References Cited

U.S. PATENT DOCUMENTS

| | | | | |
|---|---|---|---|---|
| 6,306,957 | B1 * | 10/2001 | Nakano et al. | 524/700 |
| 6,514,428 | B2 * | 2/2003 | Suzuki et al. | 252/74 |
| 6,844,393 | B2 * | 1/2005 | Goto et al. | 524/588 |
| 7,291,671 | B2 * | 11/2007 | Fukui | 524/588 |
| 7,329,706 | B2 * | 2/2008 | Fukui et al. | 524/588 |
| 7,417,078 | B2 * | 8/2008 | Fujiki et al. | 523/137 |
| 7,547,743 | B2 * | 6/2009 | Goto et al. | 524/588 |
| 7,592,383 | B2 * | 9/2009 | Fukui | 524/261 |
| 7,622,539 | B2 * | 11/2009 | Fukui et al. | 528/32 |
| 7,695,817 | B2 * | 4/2010 | Lin et al. | 428/447 |
| 8,017,684 | B2 * | 9/2011 | Endo et al. | 524/588 |
| 2002/0077439 | A1 * | 6/2002 | Sakurai et al. | 528/10 |
| 2003/0195124 | A1 * | 10/2003 | Yamada et al. | 508/154 |

FOREIGN PATENT DOCUMENTS

| | | |
|---|---|---|
| EP | 0 939 115 A1 | 9/1999 |
| JP | 2938428 | 6/1999 |
| JP | 2938429 | 6/1999 |
| JP | 3952184 | 5/2007 |

* cited by examiner

*Primary Examiner* — Robert S Loewe
(74) *Attorney, Agent, or Firm* — Oblon, Spivak, McClelland, Maier & Neustadt, L.L.P.

(57) ABSTRACT

A thermally conductive silicone grease composition comprising:
(A) an organopolysiloxane having at least two alkenyl groups in one molecule and having a kinetic viscosity of 5,000 to 100,000 mm²/s at 25° C.;
(B) a hydrolyzable methylpolysiloxane having a trifunctional termination at one end and represented by the following general formula (2):

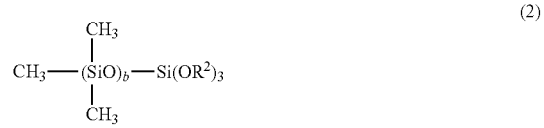

(2)

wherein $R^2$ represents an alkyl group having 1 to 6 carbon atoms and b is an integer of 5 to 100;
(C) a thermally conductive filler having a thermal conductivity of at least 10 W/m·° C.;
(D) an organohydrogenpolysiloxane containing from 2 to 5 hydrogen atoms in one molecule directly bound to silicon atoms (Si—H groups);
(E) a bonding aid having a triazine ring and at least one alkenyl group in one molecule; and
(F) a catalyst selected from the group consisting of platinum and platinum compounds.

3 Claims, No Drawings

THERMALLY CONDUCTIVE SILICONE GREASE COMPOSITION

CROSS-REFERENCE TO RELATED APPLICATION

This non-provisional application claims priority under 35 U.S.C. §119(a) on Patent Application No. 2010-253762 filed in Japan on Nov. 12, 2010, the entire contents of which are hereby incorporated by reference.

TECHNICAL FIELD

This invention relates to a thermally conductive silicone grease composition wherein an increase in hardness is lessened and the lowering of elongation is small when thermal aging after curing is carried out at high temperatures.

BACKGROUND ART

It is widely known that electronic parts such as LSI, IC chips, etc., generate heat in use and thus, the performance thereof lowers owing to the heat generation. In order to solve this problem, a variety of heat dissipation techniques have been employed. One of ordinary methods includes placing a cooling member in the vicinity of a heat generation unit and bringing them in intimate contact with each other thereby dissipating heat by efficient removal of heat through the cooling member. In this connection, however, if there is a space between the heat generation member and the cooling member, thermal conduction does not proceed smoothly because of the presence of air, which is poor in thermal conductivity, so that the temperature of the heat generation member does not decrease satisfactorily. To prevent this, there have been conventionally used, for the purpose of preventing the presence of air, heat dissipating materials, heat-dissipating sheets or heat dissipating greases, which are good at thermal conductivity and are able to follow a surface profile of member (Japanese Patent Nos. 2938428, 2938429 and 3952184).

Among heat dissipating greases, some greases are imparted with a bonding performance so as to cause a semiconductor chip and a heat spreader to be strongly bonded together. However, if there is no grease intervention between the semiconductor chip and the heat spreader, a satisfactory heat dissipation performance is not obtainable to considerably lower the performance, so that it is important to strongly bond the semiconductor chip and the heat spreader. Although these materials are high in bonding force, it has been frequently experienced that the hardness of the material increases through aging at high temperatures during use. The elongation of material lowers associated with the increased hardness, with the possibility that the strain of the chip caused by the thermal history of heat generation/cooling may not be followed, resulting in detachment or, in the worst case, leading to breakage of the chip.

SUMMARY OF THE INVENTION

The present invention has been made in order to solve the above problem. An object of the present invention is to provide a thermally conductive silicone grease composition, which is smaller in hardness rise and also in lowering of elongation than conventional art counterparts when thermally aged at high temperatures after curing.

We have made intensive studies to achieve the above object and found that a thermally conductive silicone grease composition including the following components (A) to (F) is able to provide a cured product that is small in hardness rise and also in lowering of elongation when thermally aged at high temperatures.

Therefore, the present invention provides a thermally conductive silicone grease composition comprising (A) 100 parts by weight of an organopolysiloxane having at least two alkenyl groups in one molecule and having a kinetic viscosity of 5,000 to 100,000 mm$^2$/s at 25° C.;

(B) 10 to 50 parts by weight of a hydrolyzable methylpolysiloxane having a trifunctional termination at one end and represented by the following general formula (2):

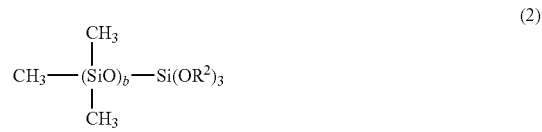

wherein $R^2$ represents an alkyl group having 1 to 6 carbon atoms and b is an integer of 5 to 100;

(C) 500 to 1,500 parts by weight of a thermally conductive filler having a thermal conductivity of at least 10 W/m·° C.;

(D) an organohydrogenpolysiloxane containing from 2 to 5 hydrogen atoms directly bound to silicon atoms (Si—H groups) in one molecule in such an amount that the number of Si—H groups/the number of the alkenyl groups of the component (A)=1.7 to 2.8;

(E) 0.05 to 0.5 parts by weight of a bonding aid having a triazine ring and at least one alkenyl group in one molecule; and (F) a catalyst selected from the group consisting of platinum and platinum compounds in such an amount of 0.1 to 500 ppm of platinum atom relative to the component (A).

The composition may further include (G) 0.05 to 0.5 parts by weight, per 100 parts by weight of the component (A), of an inhibiting agent selected from the group consisting of an acetylene compound, a nitrogen compound, an organophosphorus compound, an oxime compound and an organochloro compound.

The thermally conductive silicone grease composition should preferably have an elongation at breakage of not smaller than 100% when a sheet of the composition after curing at 150° C. for 90 minutes is measured according to a method described in JIS K6251 and an elongation at breakage of not smaller than 80% after shaping into a 2 mm thick sheet and subsequent aging at 150° C. for 1,000 hours.

ADVANTAGEOUS EFFECT OF INVENTION

The thermally conductive silicone grease composition of the present invention is such that hardness rise is small and elongation decrease is suppressed when the composition is heated at high temperatures.

DESCRIPTION OF EMBODIMENTS

The thermally conductive silicone grease composition of the present invention includes as essential component:
(A) an alkenyl group-containing organopolysiloxane;
(B) a hydrolyzable methylpolysiloxane;
(C) a thermally conductive filler;
(D) an organohydrogenpolysiloxane;
(E) a triazine ring and alkenyl group-containing bonding aid; and (F) a platinum catalyst; and, if required,
(G) an addition reaction inhibiting agent.

Component (A)

The organopolysiloxane serving as component (A) included in the composition of the present invention has at least two alkenyl groups directly bound to silicon atoms in one molecule and is represented by the following formula (1)

$$R^1_a SiO_{(4-a)/2} \quad (1)$$

wherein $R^1$ may be the same or different and represents an unsubstituted or substituted monovalent hydrocarbon group having 1 to 10 carbon atoms, preferably 1 to 8 carbon atoms, and a is a positive number of 1.5 to 2.8, preferably 1.8 to 2.5 and more preferably 1.95 to 2.05.

The unsubstituted or substituted monovalent hydrocarbon group represented as $R^1$ and bound to a silicon atom includes: an alkyl group such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, a decyl group or the like; an aryl group such as a phenyl group, a tolyl group, a xylyl group, a naphthyl group or the like; an aralkyl group such as a benzyl group, a phenylethyl group, a phenylpropyl group or the like; an alkenyl group such as a vinyl group, an allyl group, a propenyl group, an isopropenyl group, a butenyl group, a hexenyl group, a cyclohexenyl group, an octenyl group or the like; and those groups wherein the hydrogen atoms of the groups indicated above are partly or wholly substituted with a halogen atom such as fluorine, bromine, chlorine or the like, a cyano group or the like, e.g. a chloromethyl group, a chloropropyl group, a bromoethyl group, a trifluoropropyl group, a cyanoethyl group or the like. Preferably, at least 90 mole % of all the $R^1$'s is a methyl group.

It is necessary that at least two of all $R^1$'s be an alkenyl group having preferably 2 to 8 carbon atoms, more preferably 2 to 6 carbon atoms and most preferably a vinyl group. The content of the alkenyl groups is at $2.0 \times 10^{-5}$ to $1.0 \times 10^{-4}$ mols/g, preferably at $2.0 \times 10^{-5}$ to $6.0 \times 10^{-5}$ mols/g. If the amount of the alkenyl groups is less than $2.0 \times 10^{-5}$ mols/g, there may be some case where the composition becomes poor in spreadability. On the other hand, when the amount exceeds $1.0 \times 10^{-4}$ mols/g, there may be the case where hardness rise during aging after curing of the composition becomes so great that elongation decreases. The alkenyl groups may be bound to a silicon atom at the terminal of the molecular chain or a silicon atom at any position of the molecular chain or bound at both.

The structure of the organopolysiloxane generally has a main chain consisting of recurring units of diorganosiloxane and is a linear structure wherein both terminal ends of the molecular chain are blocked with a triorganosiloxy group, but may partially include a branched structure or a cyclic structure.

If the kinetic viscosity of this organopolysiloxane at 25° C. is lower than 5,000 mm²/s, hardness rise during thermal aging after curing of the composition becomes great, thus decreasing elongation. On the other hand, when the kinetic viscosity exceeds 100,000 mm²/s, the resulting composition becomes poor in spreadability. Hence, the kinetic viscosity is in the range of 5,000 to 100,000 mm²/s, preferably 10,000 to 100,000 mm²/s. It will be noted that this kinetic viscosity is a value measured by means of Ubbelohde-type Ostwald viscometer.

Examples of the component (A) include dimethylpolysiloxanes blocked with a dimethylvinylsilyl group at both ends. These may be used singly or in combination of two or more.

Component (B)

The component (B) used in the present invention is a hydrolyzable methylpolysiloxane trifunctionally terminated at one end and is represented by the following general formula (2)

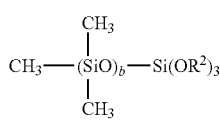

(2)

wherein $R^2$ is an alkyl group having 1 to 6 carbon atoms and b is an integer of 5 to 100.

$R^2$ is an alkyl group having 1 to 6 carbon atoms, which includes a methyl group, an ethyl group, a propyl group, an isopropyl group, a butyl group, a sec-butyl group, a tert-butyl group, a pentyl group, a hexyl group or the like. If b in the hydrolyzable methylpolysiloxane trifunctionally terminated at one end as the component (B) represented by the general formula (2) is smaller than 5, oil breeding from the resulting silicone grease composition becomes considerable, disenabling a bonding performance to be shown. If b is over 100, wettability associated with filler becomes unsatisfactory. For the reasons mentioned above, b is an integer of 5 to 100, preferably 10 to 60.

The amount of the hydrolyzable methylpolysiloxane trifunctionally terminated at one end is within a range of 10 to 50 parts by weight per 100 parts by weight of the component (A). This is because if the amount is less than 10 parts by weight, satisfactory wettability is not shown and if the amount is greater than 50 parts by weight, bleeding from the composition becomes pronounced.

Component (C)

As to the thermally conductive filler of the component (C) having a given thermal conductivity, if the thermal conductivity is less than 10 W/m·° C., thermal conductivity per se of the resulting silicone grease composition becomes smaller accordingly. In this sense, the thermal conductivity of filler should be at least 10 W/m·° C. and is preferably in the range of 10 to 5,000 W/m·° C. As such a thermally conductive filler, powders of inorganic compounds are usable. The inorganic compound powders used as the component (C) include one or two or more of aluminum powder, zinc oxide powder, titanium oxide powder, magnesium oxide powder, alumina powder, aluminum hydroxide powder, boron nitride powder, aluminum nitride powder, diamond powder, gold powder, silver powder, copper powder, carbon powder, nickel powder, indium powder, gallium powder, metallic silicon powder and silicon dioxide powder. The term "thermal conductivity" used herein means a value measured by use of a measuring instrument of QTM-500, made by Kyoto Electronics Manufacturing Co., Ltd.

If the average particle size of an inorganic compound powder used as the component (C) is either smaller than 0.5 μm or larger than 100 μm, the resulting composition cannot be increased as desired with respect to a filling rate thereof. Therefore, the average size is within a range of 0.5 to 100 μm, preferably 1 to 50 μm. In the practice of the present invention, the average size means a volume average size [MV] on the volume basis, which can be measured by Microtrack MT330 OEX, made by Nikkiso Co., Ltd. The inorganic compound powder used in the present invention may be subjected to hydrophobic treatment with an organosilane, an organosilazane, an organopolysiloxane, an organofluorine compound or the like. The hydrophobic treatment may be carried out by ordinary known methods including a method wherein an inorganic compound powder and an organosilane or a partial hydrolyzate thereof are mixed in a mixer such as Trimix, Twin Mix, Planetary Mixer (all being the registered trade names of mixers, made by Inoue Manufacturing Co., Ltd.), Ultra Mixer (the registered trade name of a mixer, made by Mizuho Industrial Co., Ltd.), Hivis Disper Mix (the registered trade name of a mixer, made by Primix Corporation) or the like. If necessary, the mixture may be heated to 50° C. to 100° C. For mixing, there may be used a solvent such as toluene, xylene, petroleum ether, mineral spirit, isoparaffin, isopropyl alcohol, ethanol or the like. In this case, the solvent should preferably be removed after mixing by use of a vacuum apparatus. As a diluting solvent, there may be used an organopolysiloxane used as the component (A), which is a liquid component of the present invention. The composition prepared by this method is within the scope of the present invention.

If an amount of the thermally conductive filler (inorganic compound powder) is less than 500 parts by weight per 100 parts by weight of the component (A), the resulting composition becomes low in thermal conductivity. If the amount exceeds 1,500 parts by weight, workability is degraded owing to an increased viscosity of the composition. Thus, the amount is in the range of 500 to 1,500 parts by weight, more preferably 600 to 1,300 parts by weight.

Component (D)

The organohydrogenpolysiloxane of the component (D) is one represented, for example, by the following average compositional formula (3)

$$R^3{}_c H_d SiO_{(4-c-d)/2} \quad (3)$$

wherein $R^3$ represents an unsubstituted or substituted monovalent hydrocarbon group having 1 to 12 carbon atoms, preferably 1 to 10 carbon atoms, c is a value of 0.7 to 2.1, preferably 0.8 to 2.05, and d is a value of 0.001 to 1.0, preferably 0.005 to 1.0 provided that c+d is a positive value of 0.8 to 3.0, preferably 1.0 to 2.5.

The organohydrogenpolysiloxane having hydrogen atoms directly bound to silicon atoms (Si-G groups) and serving as the component (D) should have at least two Si—H groups in the molecule so as to allow the composition to have a network structure formed by crosslinking. When the Si—H groups exceed five in number, hardness rise during thermal aging becomes excessive, so that elongation decreases. Accordingly, the number of the Si—H groups is within a range of 2 to 5.

The residual organic group $R^3$ joined to the silicon atom includes: an alkyl group such as a methyl group, an ethyl group, a propyl group, a butyl group, a hexyl group, a dodecyl group or the like; an aryl group such as a phenyl group or the like; an aralkyl group such as a 2-phenylethyl group, a 2-phenylpropyl group or the like; a substituted, e.g. a halogen-substituted, hydrocarbon group such as a chloromethyl group, a 3,3,3-trifluoropropyl group or the like; and an epoxy ring-containing organic group (or a glycidyl group or glycidyloxy group-substituted alkyl group) such as a 2-glycidoxyethyl group, a 3-glycidoxypropyl group, a 4-glycidoxybutyl group or the like. The organohydrogenpolysiloxane having such Si—H groups may be linear, branched or cyclic, or may be a mixture thereof.

When the amount of the component (D) is such that a ratio of the number of Si—H groups in the component (D) to the number of the alkenyl groups in the component (A), i.e. {the number of Si—H groups}/{the number of alkenyl groups in the component (A)}, is smaller than 1.7, satisfactory bonding performance cannot be shown, thereby worsening adhesion to substrate. If the ratio exceeds 2.8, hardness rise during thermal aging becomes too high, thereby lowering elongation. The ratio is within a range of 1.7 to 2.8, preferably 2.0 to 2.5.

Component (E)

The bonding aid of the component (E) is one that has a triazine ring and at least one alkenyl group in one molecule and is capable of imparting bonding properties to the composition. The alkenyl group contained in the component (E) may be linear or branched and includes a vinyl group, an allyl group, a 1-butenyl group, a 1-hexenyl group, a 2-methylpropenyl group, a (meth)acrylic group or the like. In view of costs, an acrylic group is preferred. Specific examples of the component (E) are triallyl isocyanurate, trimethacryl isocyanurate, and siloxane modified products (derivatives) such as alkoxysilyl-substituted triallyl isocyanurates wherein one to two alkoxysillyl groups, such as a trimethoxysilyl group, are added to one to two allyl groups of the triallyl isocyanurate and hydrolysis condensates thereof.

The component (E) is used within a range of 0.05 to 0.5 parts by weight, preferably 0.05 to 0.3 parts by weight, per 100 parts by weight of the component (A). This is because if the amount is less than 0.05 parts by weight, the resulting composition does not show a satisfactory bonding performance and if the amount exceeds 0.5 parts by weight, hydrosilylation reaction does not proceed well and thus, no bonding performance cannot be developed.

Component (F)

The catalyst of the component (F) selected from platinum and platinum compounds is a promoting component of the addition reaction between the alkenyl group of the component (A) and the Si—H group of the component (D). This component (F) includes, for example, platinum itself, chloroplatinic acid, a platinum-olefin complex, a platinum-alcohol complex, a platinum coordination compound or the like. The amount of the component (F) is within a range of 0.1 to 500 ppm relative to the weight of the component (A) because if it is less than 0.1 ppm of platinum atom, no catalytic effect is expected and if it exceeds 500 ppm of platinum atom, the effect does not increase, resulting in poor economy.

Component (G)

The inhibiting agent of component (G) is one, which suppresses hydrosilylation reaction at room temperature from proceeding thereby ensuring a prolonged shelf life and pot life. As a reaction inhibiting agent, known ones may be used and include acetylene compounds, a variety of nitrogen compounds, organophosphorus compounds, oxime compounds, organochloro compounds and the like. As to the amount of the component (G), if the amount is smaller than 0.05 parts by weight, an adequate shelf life and pot life cannot be obtained, and if the amount is greater than 0.5 parts by weight, curability lowers. Hence, the amount is preferably within a range of 0.05 to 0.5 parts by weight per 100 parts by weight of the component (A). These may be used after dilution with toluene or the like in order to allow good dispersion in the silicone grease composition.

Other Components

Aside from the components (A) to (G) set out above, there may be added an antioxidant and the like, if necessary, to prevent degradation.

Preparation Method

For the preparation of the thermally conductive silicone grease composition of the present invention, there can be adopted a mixing method wherein the components (A) to (F) and, if necessary, other components are mixed in a mixer such as Trimix, Twin Mix, Planetary Mixer (all being the registered trade names of mixers, made by Inoue Manufacturing Co., Ltd.), Ultra Mixer (the registered trade name of a mixer, made by Mizuho Industrial Co., Ltd.), Hivis Disper Mix (the registered trade name of a mixer, made by Primix Corporation) or the like.

If viscosity is high, workability becomes worsened. In this sense, the thermally conductive silicone grease composition of the present invention should preferably have a viscosity of 10 to 1,000 Pa·s, more preferably 50 to 1,000 Pa·s. It will be noted that such a viscosity can be achieved by controlling the components of the silicone grease composition as set out above. In the practice of the present invention, the viscosity is measured at 25° C. by means of Malcom viscometer (using Rotor A under conditions of 10 rpm and a shear rate of 6 [l/s]).

The thermally conductive silicone grease composition of the invention can be conveniently used by permitting it to intervene between electronic parts such as LSI or other heat-generating members and cooling members thereby dissipating heat through thermal conduction of heat from the heat-generating member to the cooling member. The composition can be used similarly to existing thermally conductive silicone grease compositions.

From the standpoint of the strain followability of chip, the silicone grease composition of the invention should preferably have an elongation at breakage of at least 100%, more preferably at least 120%, when a sheet of the composition obtained after curing at 150° C. for 90 minutes is subjected to measurement according to the method described in JIS K6251. The upper limit is not critically limited and is generally at up to 400%, preferably at up to 300%. It will be noted that the elongation at breakage can be achieved by using a component (component (A)) having a large molecular weight to prepare the composition.

Likewise, from the standpoint of the strain followability of chip after a reliability test of package, the silicone grease composition of the present invention should have an elongation at breakage of at least 80% when determined by forming a 2 mm thick sheet and subjecting the sheet, after aging at 150° C. for 1,000 hours, to the method described in JIS K6251. Although the upper limit is not critically limited, it is generally at up to 300%, preferably at up to 200%. It will be noted that such an elongation at breakage after the aging can be achieved by using a component (D) having from two to five crosslinking points to prepare the composition.

EXAMPLES

Examples and Comparative Examples are shown to particularly illustrate the present invention, which should not be construed as limited to the following Examples. Tests on the physical properties related to the present invention were carried out in the following ways.

[Viscosity]

The absolute viscosity of grease composition was measured by means of the Malcom viscometer (Type PC-1T) at 25° C.

[Thermal Conductivity]

The respective compositions were poured into a 3 cm thick mold and covered with a kitchen wrap, followed by measurement with a device of Model QTM-500, made by Kyoto Electronic Manufacturing Co., Ltd.

[Elongation at Breakage]

The respective compositions were thermally vulcanized at 150° C. for 90 minutes to provide a 2 mm thick sheet, followed by measurement after shaping the sheet into No. 2 dumbbell, described in JIS K6251. Separately, a sample cured in the form of a sheet was aged at 150° C. for 1,000 hours and its elongation after the aging was measured by a similar method.

[Bonding Strength]

The respective compositions were each sandwiched between a 1 mm×1 mm silicon wafer and a 2.5 mm×2.5 mm silicon wafer and thermally heated at 150° C. for 90 minutes while pressing with a 1.8 kgf clip, followed by measurement of bonding strength by use of Dage series-4000PXY, made by Dage Deutchland GmbH.

The following components used to prepare the compositions of the present invention were provided.

Component (A)

A-1: Dimethylpolysiloxane blocked with a dimethylvinylsilyl group at opposite ends and having a kinetic viscosity of 30,000 mm$^2$/s at 25° C.

A-2: Dimethylpolysiloxane blocked with a dimethylvinylsilyl group at opposite ends and having a kinetic viscosity of 100,000 mm$^2$/s at 25° C.

A-3: Dimethylpolysiloxane blocked with a dimethylvinylsilyl group at opposite ends and having a kinetic viscosity of 10,000 mm$^2$/s at 25° C.

A-4 (Comparative Example):
Dimethylpolysiloxane blocked with a dimethylvinylsilyl group at opposite ends and having a kinetic viscosity of 500,000 mm$^2$/s at 25° C.

A-5 (Comparative Example):
Dimethylpolysiloxane blocked with a dimethylvinylsilyl group at opposite ends and having a kinetic viscosity of 3,000 mm$^2$/s at 25° C.

Component (B)

B-1:

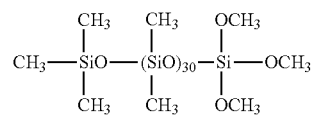

B-2:

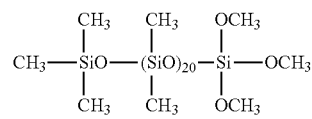

Component (C)

Two types of aluminum powders and a zinc oxide powder indicated below were mixed at mixing ratios, indicated in the following Table 1, at room temperature for 15 minutes by use of a 5 liter planetary mixer (made by Inoue Manufacturing Co., Ltd., thereby obtaining C-1.

Aluminum powder having an average size of 2.0 μm (thermal conductivity: 237 W/m·° C.)

Aluminum powder having an average size of 10.0 μm (thermal conductivity: 237 W/m·° C.)

Zinc oxide powder having an average size of 1.0 μm (thermal conductivity: 25 W/m·° C.)

TABLE 1

| Component (C) | Aluminum powder having an average size of 2.0 μm | Aluminum powder having an average size of 10.0 μm | Zinc oxide powder having an average size of 1.0 μm |
|---|---|---|---|
| C-1 | 225 | 500 | 240 |

Unit: g

Component (D)

Organohydrogenpolysiloxanes represented by the following formulas

D-1:

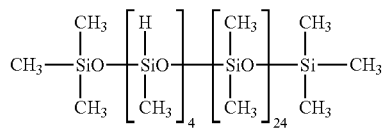

D-2:

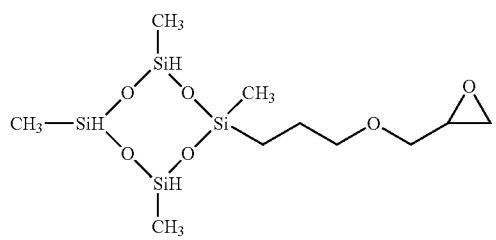

D-3:

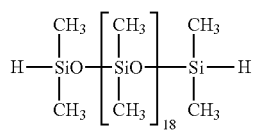

D-4 (Comparative Example):

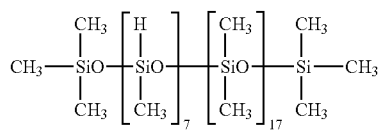

D-5 (Comparative Example):

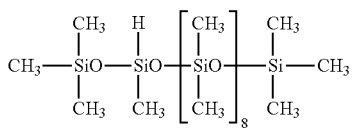

Component (E)

E-1:

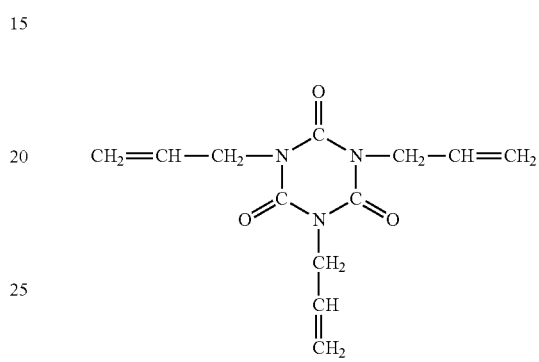

Component (F)

F-1: A-1 solution of a platinum-divinyltetramethyldisiloxane complex containing 1 wt % of platinum atom Component (G)

G-1: Toluene solution of 50 wt % of 1-ethynyl-1-cyclohexanol

Examples 1 to 7

Comparative Examples 1 to 7

The compositions of Examples 1 to 7 and Comparative Examples 1 to 7 were obtained by mixing the components (A) to (G) in the following way.

More particularly, component (A) was placed in a 5 liter planetary mixer (made by Inoue Manufacturing Co., Ltd.), to which components (B) and (C) were added in such amounts as indicated in Tables 2 and 3, followed by mixing at 150° C. for one hour. The resulting mixtures were each cooled down to a normal temperature, to which components (D), (E), (F) and (G) were added in amounts indicated in Tables 2 and 3 and mixed to uniformity.

TABLE 2

| Formulation (parts by weight) | | Example | | | | | | |
|---|---|---|---|---|---|---|---|---|
| | | 1 | 2 | 3 | 4 | 5 | 6 | 7 |
| Component (A) | A-1 | 100 | 100 | | | 100 | 100 | 100 |
| | A-2 | | | 100 | | | | |
| | A-3 | | | | 100 | | | |
| | A-4 | | | | | | | |
| | A-5 | | | | | | | |
| Component (B) | B-1 | 50 | 50 | | 40 | 50 | 50 | 50 |
| | B-2 | | | 50 | | | | |

TABLE 2-continued

| Formulation | | Example | | | | | | |
|---|---|---|---|---|---|---|---|---|
| (parts by weight) | | 1 | 2 | 3 | 4 | 5 | 6 | 7 |
| Component (C) | C-1 | 965 | 965 | 850 | 965 | 965 | 965 | 965 |
| Component (D) | D-1 | | | | | 1.9 | 5.5 | 5.0 |
| | D-2 | 0.66 | 0.55 | 0.42 | 0.8 | 0.7 | | |
| | D-3 | 2.3 | 1.91 | 1.47 | 2.8 | | 2.3 | 2.1 |
| | D-4 | | | | | | | |
| | D-5 | | | | | | | |
| | Si—H/Si—Vi (number ratio) | 2.4 | 2.0 | 2.2 | 2.0 | 2.1 | 2.2 | 2.0 |
| Component (E) | E-1 | 0.13 | 0.13 | 0.13 | 0.13 | 0.13 | 0.13 | 0.05 |
| Component (F) | F-1 | 0.09 | 0.09 | 0.09 | 0.09 | 0.09 | 0.09 | 0.09 |
| Component (G) | G-1 | 0.13 | 0.13 | 0.13 | 0.13 | 0.13 | 0.13 | 0.13 |
| | | Results of evaluation | | | | | | |
| Viscosity (Pa · s) | | 252 | 261 | 353 | 282 | 248 | 211 | 245 |
| Thermal conductivity (W/m · ° C.) | | 2.5 | 2.5 | 2.3 | 2.8 | 2.5 | 2.4 | 2.5 |
| Elongation (%) | | 133 | 177 | 189 | 131 | 142 | 155 | 138 |
| Elongation after aging at 150° C. for 1,000 hours (%) | | 92 | 133 | 139 | 94 | 89 | 109 | 103 |
| Bonding strength (N) | | 106 | 55 | 58 | 72 | 91 | 43 | 29 |

TABLE 3

| Formulation | | Comparative Example | | | | | | |
|---|---|---|---|---|---|---|---|---|
| (parts by weight) | | 1 | 2 | 3 | 4 | 5 | 6 | 7 |
| Component (A) | A-1 | 100 | 100 | | | 100 | 100 | 100 |
| | A-2 | | | | | | | |
| | A-3 | | | | | | | |
| | A-4 | | | 100 | | | | |
| | A-5 | | | | 100 | | | |
| Component (B) | B-1 | 50 | 50 | | 40 | 50 | 50 | 50 |
| | B-2 | | | 50 | | | | |
| Component (C) | C-1 | 965 | 965 | 600 | 965 | 965 | 965 | 965 |
| Component (D) | D-1 | | | | 13.2 | | | |
| | D-2 | 0.8 | 0.44 | 0.42 | | | | 0.6 |
| | D-3 | 2.8 | 1.53 | 1.47 | 5.4 | | | 2.1 |
| | D-4 | | | | | 1.6 | | |
| | D-5 | | | | | | 6.6 | |
| | Si—H/Si—Vi (number ratio) | 2.9 | 1.6 | 2.2 | 2.2 | 2.2 | 2.2 | 2.2 |
| Component (E) | E-1 | 0.13 | 0.13 | 0.13 | 0.13 | 0.13 | 0.13 | 0.6 |
| Component (F) | F-1 | 0.09 | 0.09 | 0.09 | 0.09 | 0.09 | 0.09 | 0.09 |
| Component (G) | G-1 | 0.13 | 0.13 | 0.13 | 0.13 | 0.13 | 0.13 | 0.13 |
| | | Results of evaluation | | | | | | |
| Viscosity (Pa · s) | | 242 | 252 | Not formed as grease | 211 | 284 | 233 | 241 |
| Thermal conductivity (W/m · ° C.) | | 2.5 | 2.5 | | 2.4 | 2.5 | 2.4 | 2.5 |
| Elongation (%) | | 122 | 202 | | 134 | 116 | Not formed as sheet | Not formed as sheet |
| Elongation after aging at 150° C. for 1,000 hours (%) | | 61 | 162 | | 48 | 32 | | |
| Bonding strength (N) | | 31 | 5 | | 22 | 114 | | |

As will be seen from the foregoing, the present invention provides a thermally conductive silicone grease composition for heat dissipation, which achieves a good balance between the bonding performance and the flexibility of material after high temperature aging. With prior-art counterparts, if adhesion performance is imparted, a problem is involved in reliability at the time of high-temperature aging. If reliability is the first priority, there arises a problem in that bonding performance cannot be imparted. That is, a difficulty has been encountered in balancing the bonding performance and the reliability at the time of high-temperature aging.

Japanese Patent Application No. 2010-253762 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A thermally conductive silicone grease composition comprising:
   (A) 100 parts by weight of an organopolysiloxane having at least two alkenyl groups in one molecule and having a kinetic viscosity of 5,000 to 100,000 mm$^2$/s at 25° C.;

(B) 10 to 50 parts by weight of a hydrolyzable methylpolysiloxane having a trifunctional termination at one end and represented by the following general formula (2):

(2)

wherein $R^2$ represents an alkyl group having 1 to 6 carbon atoms and b is an integer of 5 to 100;

(C) 500 to 1,500 parts by weight of a thermally conductive filler having a thermal conductivity of at least 10 W/m·°C.;

(D) an organohydrogenpolysiloxane containing from 2 to 5 hydrogen atoms directly bound to silicon atoms (Si—H groups) in such an amount that the number of Si—H groups/the number of the alkenyl groups of the component (A)=1.7 to 2.8;

(E) 0.05 to 0.5 parts by weight of a bonding aid having a triazine ring and at least one alkenyl group in one molecule; and (F) a catalyst selected from the group consisting of platinum and platinum compounds in such an amount of 0.1 to 500 ppm of a platinum atom relative to the component (A).

2. The composition according to claim 1, further comprising 0.05 to 0.5 parts by weight, per 100 parts by weight of the component (A), of (G) an inhibiting agent selected from the group consisting of an acetylene compound, a nitrogen compound, an organophosphorus compound, an oxime compound and an organochloro compound.

3. The composition according to claim 1 or 2, wherein when a sheet obtained by curing said composition at 150° C. for 90 minutes is measured according to a method described in JIS K6251, an elongation at breakage is at least 100% and when said composition is shaped into a 2 mm thick sheet and aged at 150° C. for 1,000 hours, an elongation at breakage is at least 80%.

* * * * *